(12) United States Patent
Sproule, III

(10) Patent No.: US 6,315,005 B1
(45) Date of Patent: Nov. 13, 2001

(54) WATER RESISTANT ADJUSTABLE JACKETS FOR INSULATED PIPE BENDS

(76) Inventor: Charles G. Sproule, III, P.O. Box 15, Devault, PA (US) 19432

( * ) Notice: Subject to any disclaimer, the term of this patent is extended or adjusted under 35 U.S.C. 154(b) by 0 days.

(21) Appl. No.: 09/519,292

(22) Filed: Mar. 6, 2000

(51) Int. Cl.[7] .......................................... F16L 9/14
(52) U.S. Cl. .................. 138/149; 138/151; 138/158; 138/161; 138/162; 138/166; 138/167; 138/169
(58) Field of Search .................... 138/149, 151, 138/158, 159, 161, 162, 163, 166, 167, 169

(56) References Cited

U.S. PATENT DOCUMENTS

| | | | |
|---|---|---|---|
| D. 312,499 | * 11/1990 | Karakawa ............................ | 138/110 |
| 2,981,072 | 4/1961 | Brewington . | |
| 3,102,740 | 9/1963 | Plumer . | |
| 3,153,546 | 10/1964 | Dunn . | |
| 3,161,210 | * 12/1964 | Lööf ...................................... | 138/166 |
| 3,347,276 | * 10/1967 | Dunn ...................................... | 138/166 |
| 3,623,513 | 11/1971 | Dinkelkamp ......................... | 138/114 |
| 3,757,031 | * 9/1973 | Izraeli ................................... | 138/155 |
| 3,886,981 | * 6/1975 | Eliason ................................. | 138/149 |
| 3,983,905 | * 10/1976 | Witzig .................................. | 138/151 |
| 4,054,985 | 10/1977 | Aleniusson ............................ | 29/416 |
| 4,348,794 | 9/1982 | Kim et al. ............................. | 29/157.3 |
| 4,557,510 | * 12/1985 | Overmyer ............................. | 138/158 |
| 5,020,481 | * 6/1991 | Nelson ................................... | 138/149 |
| 5,727,599 | 3/1998 | Fisher et al. ......................... | 138/156 |
| 5,775,379 | 7/1998 | Manofsky ............................ | 138/149 |
| 5,797,415 | * 8/1998 | Nicholson et al. ................... | 138/149 |
| 6,034,329 | * 3/2000 | Kawamura ........................... | 138/162 |
| 6,078,009 | * 6/2000 | Kawamura ........................... | 138/162 |
| 6,182,706 | * 2/2001 | Tako et al. ............................ | 138/168 |

\* cited by examiner

Primary Examiner—James Hook
(74) Attorney, Agent, or Firm—Imre Balogh

(57) ABSTRACT

An adjustable jacket and method of covering an insulated conduit, the jacket having two parts which together form a cylindrical configuration over the insulated conduit. Overlapping flanges of the two parts equipped with grooves and ridges allow tightening of the two parts so that the jacket conforms to the underlying conduit having bends and curves.

58 Claims, 6 Drawing Sheets

WATER RESISTANT ADJUSTABLE JACKETS FOR INSULATED PIPE BENDS

BACKGROUND OF THE INVENTION

1. Field of the Invention

This invention relates to adjustable jackets for use over insulated fluid transporting pipes or tubes. More particularly, the invention relates to adjustable metal jackets and methods for covering insulated pipes therewith having fittings with various angles other than a right angle to prevent damage to the insulation from the environment.

2. Reported Developments

Industrial conduits, such as used in the chemical, petrochemical, power, pulp and refinery fields require insulation for temperature-controlled processes, energy conservation and safety. The insulation helps maintain a desired temperature of the medium carried by the conduits which is different from the temperature of the environment. Most of the industrial conduits are located outdoors and must be protected from water. The penetration of water and moisture from the air into an insulation system can cause loss of insulating performance and corrosion of the conduits. The loss of insulation property can also affect the contents of the conduit, such that a vapor component of the conduits contents may become condensed, i.e. the liquid may freeze and disrupt the fluid flow within the conduit or rupture the conduit. The partially frozen liquid may also be transferred through the conduit into processing equipment, thereby adversely affecting the operation of the equipment.

Typically, industrial pipe insulation is protected by jackets made of metal, such as aluminum and stainless steel, or flexible and semi-rigid materials, such as thermoplastics. It is relatively easy to install weather-tight jackets to straight run insulation by putting the overlap of the jackets in a watershed position in order to direct water away from the area of the overlap. Installing jackets, especially metal jackets, on fittings having elbows of 90°, 45° and Tees in a weather-tight fashion has been problematic. Conforming the shape of the jackets to elbow fittings covered with insulation is rendered rather difficult because of the various pipe diameters and the various outside diameters of the insulation covering the pipes. In practice it is economically disadvantageous to produce preshaped jackets for covering various pipe sizes covered by various thickness of insulations.

The prior art has provided, for pipe elbow insulations, a jacket comprising overlapping connecting flanges formed with interengageable ribs and grooves. The jacket is assembled around a fibrous insulation which is wrapped around a pipe elbow and angularly related pipes connected to the elbow. The grooves serve as interval moisture traps for condensation.

The prior art has also provided a method for the application of a protective cover around heat or cool insulated tube bends. In the method, a corrugated bend-form material is spirally wound into a tube and the adjoining tube edges are secured, such as by lapping, to form a non-slip joint. The corrugated tube is cut lengthwise into two or more parts which are then placed over the insulated pipe bend. The cut edges are re-joined to form the protective cover.

Still another approach of the prior art includes the provision of a jacket having a plurality of pleats that provide points of flexure so that the jacket can be conformed to the bends and curves in the underlying insulation.

Illustrative prior art approaches for providing protection jackets are disclosed, for example, in U.S. Pat. Nos. 3,153, 546; 4,054,985; and 5,775,379. While these and other approaches and proposals of the prior art greatly improved the insulation systems around pipes and tubes, there exists a need to further improve such insulation systems. Accordingly, an object of the present invention is to provide an adjustable jacket which would enclose the insulation material over the bends and joints of pipes and tubes so that the jacket can be tightened and tensioned over insulation having various diameters.

Another object of the present invention is the provision of easily installable jackets which, by their orientation on pipes and tubes, will prevent entry of water and moisture into the underlying insulation.

A further object of the present invention is the provision of jackets which can be pre-fabricated and which can be installed at the site of application without cutting or other cumbersome steps.

A still further object of the invention is the protection from corrosion of the pipes and tubes transporting fluids thereby maintaining the integrity of such fluids.

SUMMARY OF THE INVENTION

The present invention provides adjustable jackets for insulated conduits which carry fluids therein. The invention consists of three embodiments.

In the first embodiment, the invention provides: a first section of semi-circular, cross-sectional configuration having flanges equipped with grooves; a second section of semi-circular cross-sectional configuration having flanges equipped with ridges. The flanges are incrementally adjustable over the insulated conduit by snap-fitting the ridges into the grooves.

In the second embodiment the invention provides for incremental adjustment of the first section to the second section on two opposite sides of the jacket.

In the third embodiment there are provided two adjustments of the first and second sections on opposite sides of the jacket. One adjustment is incremental, and the other adjustment on the opposite side of the jacket is slideable. The incremental adjustment is made first, followed by the slideable adjustment so that the jacket tightly conforms to the configuration of the underlying insulated conduit.

The embodiments of the invention include adjustable jackets for straight and bend configurations of conduits.

DESCRIPTION OF THE PREFERRED EMBODIMENTS

In one aspect the present invention provides jackets having novel closure systems which surround insulated conduits, such as pipes and tubes. Such conduits are used extensively in industrial piping systems such as in various refineries, petrochemical, power, and pulp and paper plants. The conduits require insulation for process control, energy conservation and safety. In another aspect the present invention provides a method of installing jackets over conduits covered by insulations.

The majority of industrial conduits are located outdoors or in washdown areas and, therefore, the insulation must be protected from water and weather penetrations. The penetration of water or moisture into the insulation can cause problems such as process disruption due to the loss of insulating performance caused by the wet insulation and the accelerated corrosion of the metal conduits.

The type of insulation used on metal conduits include but are not limited to: rigid insulations, such as made of calcium silicate, perlite silicate, cellular glass, Styrofoam and polyisocyanourate/urethane; semi-rigid insulations, such as made of high density mineral wool; and soft insulations, such as made of soft fiberglass and soft elastomeric materials including elastomeric foams.

One of the most commonly used materials used to make jackets of industrial conduit is metal, such as aluminum and steel, since the metal is rugged and durable. It is relatively easy to apply a weather-tight metal jacket to straight run insulation that is horizontal by putting the jacket in a watershed position as shown in FIGS. 1 and 2.

Figure 1:
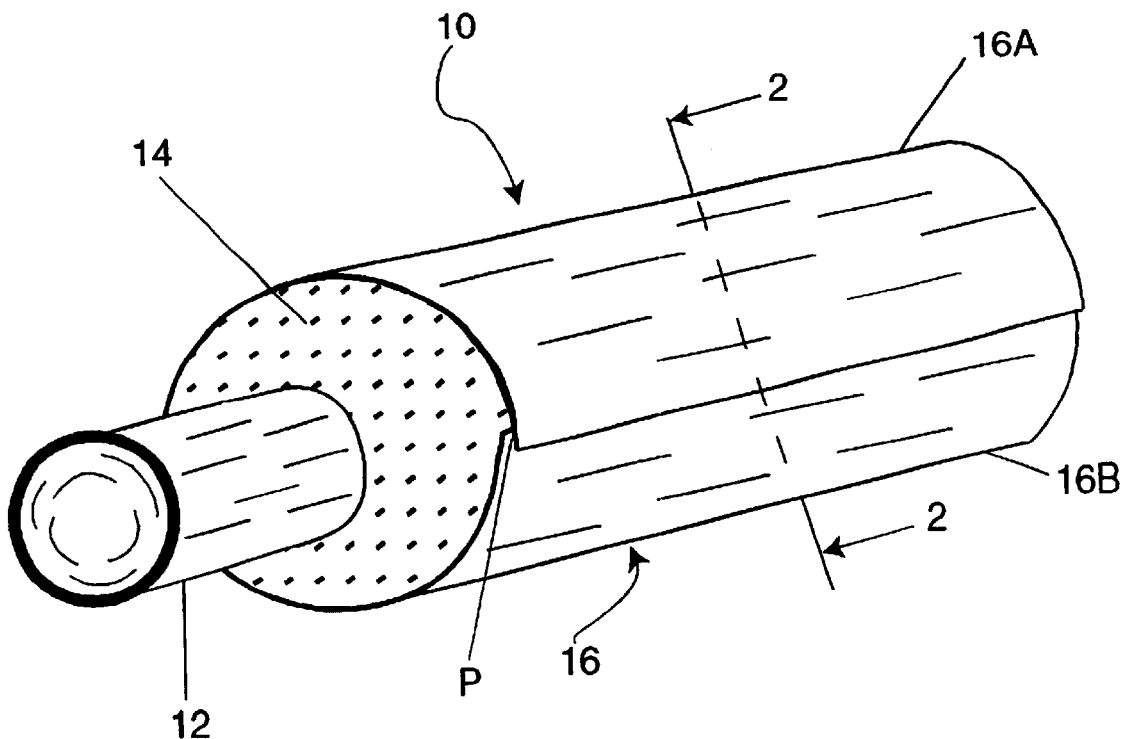
FIG. 1 is a fragmentary perspective view of a horizontal straight run conduit covered by an insulation and a jacket.

In FIG. 1 there is shown in a fragmentary prospective view a horizontal straight run conduit covered by an insulation and a jacket, wherein: the numeral 10 generally denotes the assembly of the metal pipe 12, numeral 14 denotes the insulation and 16 generally denotes the metal jacket covering the insulation. Jacket 16 comprises two parts 16A and 16B wherein 16A overlps 16B at area P. The overlap P is located at about 3 o'clock to shed water running down from portion 16A and is about 0.5 to about 1.0 inch on each side.

Figure 2:
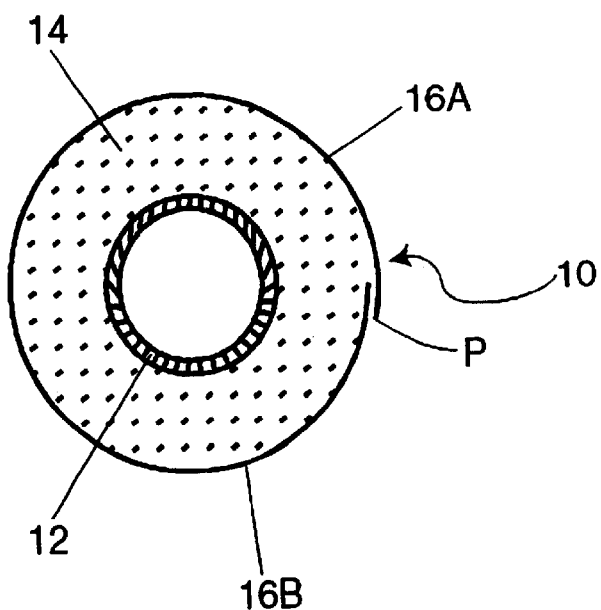
FIG. 2 is a cross-sectional view of the horizontal straight run conduit covered by an insulation and a jacket, taken along the line 2—2 of FIG. 1.

FIG. 2 is a cross-sectional view of the horizontal straight run conduit covered by an insulation and a jacket, taken along the line 2—2 of FIG. 1.

The fittings of sections of conduits shown in FIGS. 1 and 2 is accomplished by simply inserting one section of a conduit into a similar conduit section of another conduit in a male/female relationship.

Figure 3:
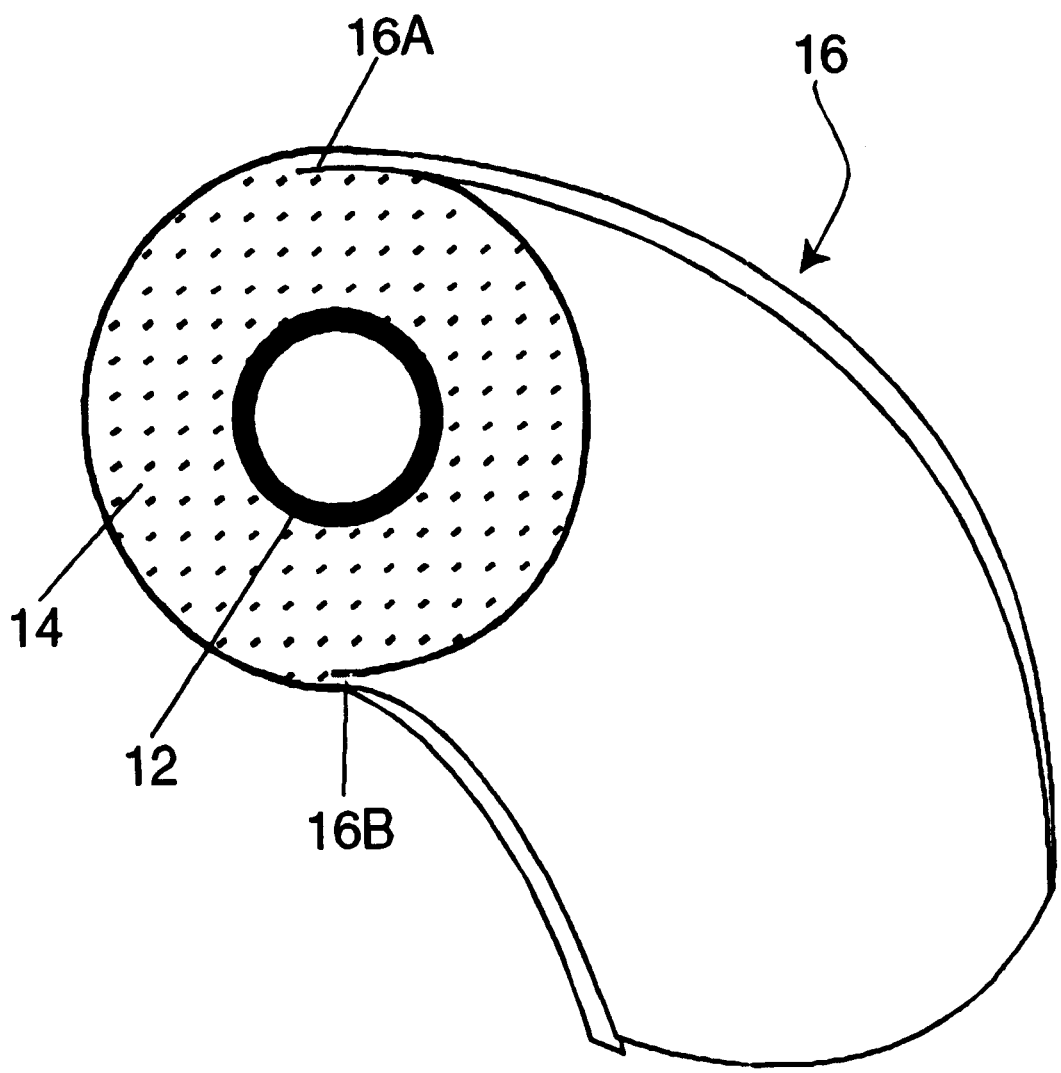
FIG. 3 is a side-elevational view of a conduit covered by insulation and a jacket wherein the conduit the insulation and the metal jacket form a fitting of less than a straight angle, such as an angle of 45°.

Installing metal jackets on fittings having less than straight angles, such at 45°, 90° and Tees is rather difficult. In order to provide conformity between the insulation 14 and metal jacket 16 in a conduit having a fitting of less than a straight angle, such as shown in FIG. 3, the lower half 16B of metal jacket 16, which is the inside radius of the metal jacket, is kept straight, while the upper half 16A of metal jacket 16, which is the outside radius of the metal jacket, is slightly bent inward. This inward bend is designed to help the metal "lay down", giving the appearance of a tight seal. This seam, however, was observed to be penetrated by water from storms and moisture from wet atmospheric conditions; water moves under the overlap and into the insulation on both the inside and outside radius of the overlaps.

Figure 4:
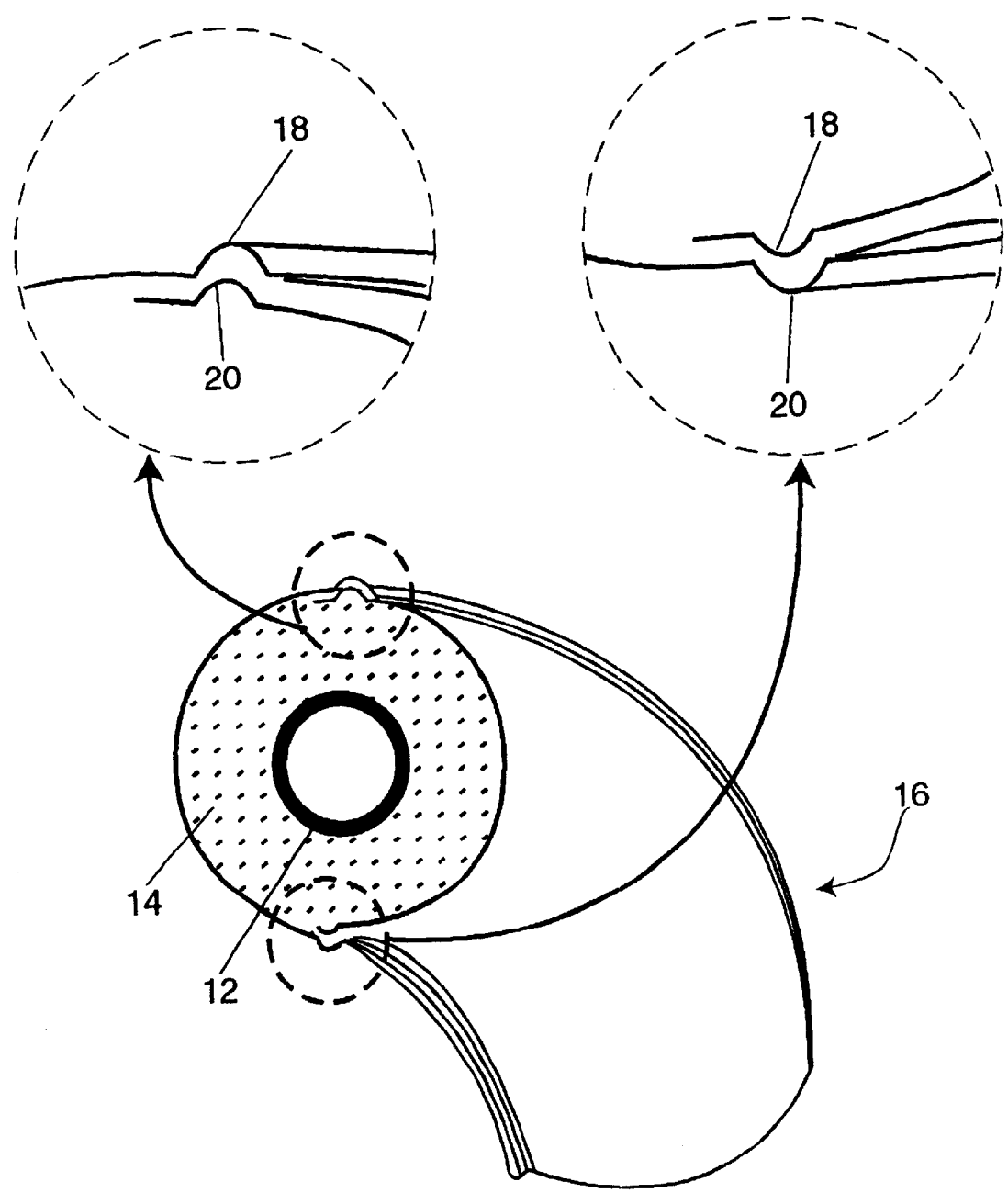
FIG. 4 is a side-elevational view of a conduit covered by insulation and a jacket wherein the conduit, the insulation and the metal jacket form a fitting of less than a straight angle, such as an angle of 45°, and the jacket is provided with grooves and ribs to guide water away from the overlaps of the jacket.

The prior art has proposed a simple but effective solution for the problem of water penetration into the jacket covering the insulation. For example, U.S. Pat. No. 3,153,546 discloses a jacket whose sections have overlapping connecting flanges formed with inter-engageable ribs and grooves, which direct water away from the insulation. This approach to solving the water penetration problem into the insulation is illustrated in FIG. 4.

Grooves and ribs 18 and 20 conform to each other. When water gets under the overlaps, it runs into the ridge formed by the grooves and ribs and is guided down and out of the jacketing at the bottom.

In installing a jacket over an insulated conduit, it is important that the jacket tightly conform to the insulation. Whether the insulation is soft, semi-rigid or rigid, it has a large tolerance in its diameter. In order to tightly adjust the jacket over the insulation, the jacket also must have a large tolerance. A simple ridge system, such as illustrated in FIG. 4, does not allow for any adjustment of the jacket circumference and, therefore, cannot be used on rigid insulation. Even on soft fibrous insulation which can be somewhat compressed, the circumferential dimension of the jacket must be about the same as the circumferential dimension of the underlying insulation.

I have now discovered that adjustability can be built into jackets whereby the jackets can be tightly conformed to the underlying insulation.

FIGS. 5A–5D schematically show overlaps of jacket fittings having built-in ridges and matching grooves therein. The ridges and grooves allow incremental adjustments of the jackets.

Figure 5A:
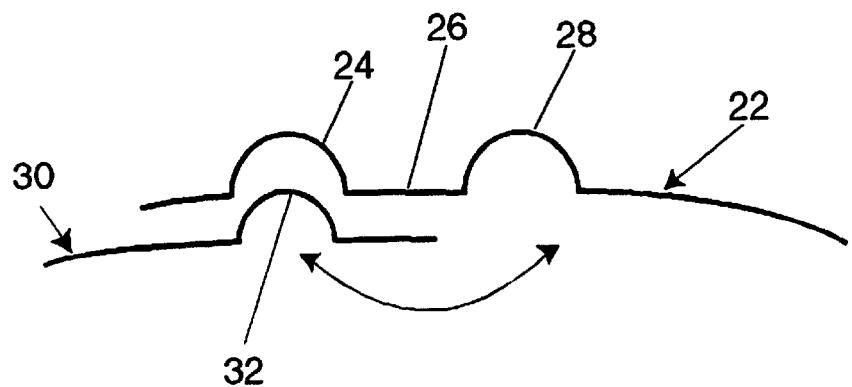
FIG. 5A is a schematic representation of a jacket fitting having an overlap, wherein the overlap comprises two rounded grooves in the top layer of the overlap and one rounded ridge in the bottom layer of the overlap.

FIG. 5A is a schematic representation of a jacket fitting having an overlap, wherein the overlap comprises two rounded grooves 2A and 2B in the top layer 22 of the overlap and one rounded ridge 32 in the bottom layer 30 of the overlap. Incremental tightening of the jacket is accomplished by sliding and moving either the top layer 22 or the bottom layer 30 so that ridge 32 is positioned into groove 28. The distance denoted by the numeral 26 between grooves 25 and groove 28 can be of from about 0.25 to about 1.0 inch or more depending on the quality of firmness and diameter of the underlying insulation. This embodiment allows for only one incremental adjustment of the overlapping jacket.

Figure 5B:
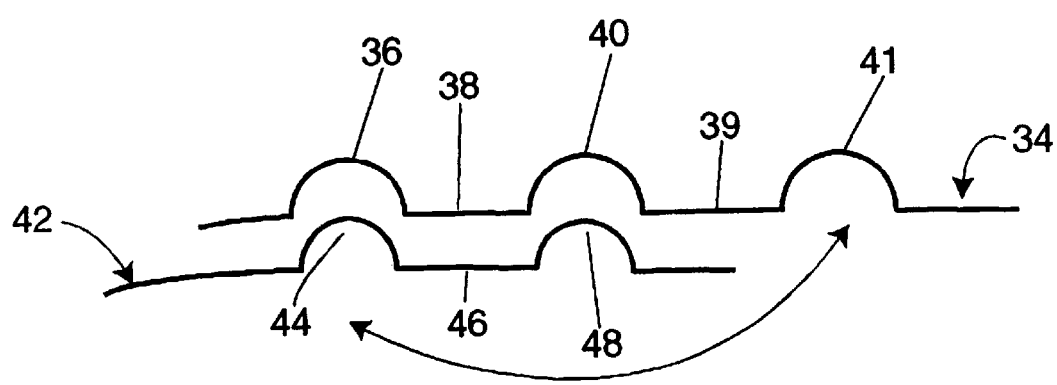
FIG. 5B is a schematic representation of a jacket fitting having an overlap, wherein the overlap comprises three rounded grooves in the top layer of the overlap and two rounded ridges in the bottom layer of the overlap.

FIG. 5B is a schematic representation of a jacket fitting having an overlap, wherein the overlap comprises three rounded grooves 36, 40 and 41 in the top layer 34 of the overlap and two rounded ridges 44 and 48 in the bottom layer 42 of the overlap. Incremental tightening of the jacket is accomplished by sliding and moving either the top layer 34 or the bottom layer 42 so that ridge 44 is positioned into groove 41. It is to be noted that this embodiment of the invention includes, in addition to what is shown in FIG. 5A, a plurality of grooves and matching ridges so that the incremental adjustment of the overlap can be repeated several times as desired.

Similarly to that described in FIG. 5A, the distance between grooves, denoted by the numerals 38 and 39, can be of from about 0.25 to about 1.0 inch or more depending on the quality of firmness and the diameter of the underlying insulation. The distance between ridges 44 and 48 is approximately the same or slightly less than the distance between the grooves. Also, as will be appreciated by those skilled in the art, it will be recognized that the ridges matching the corresponding grooves are just slightly less in size than the grooves so that the matching of the grooves and corresponding ridges will be easy. The height of the grooves and ridges are typically in the range of from about 0.125 to about 1.5 inches or larger, which is mostly by dependent on the environment in which the jacket is used: in an environment where heavy rain is prevalent, the grooves and ridges should be larger in size in order to direct large amounts of water away from the fitting.

Figure 5C:
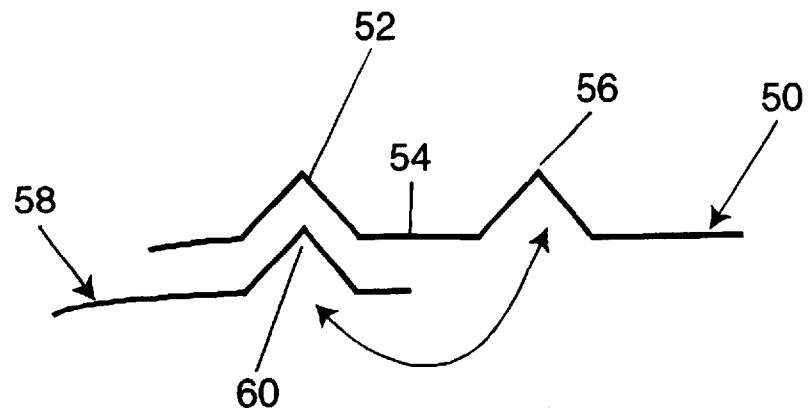
FIG. 5C is a schematic representation of a jacket fitting having an overlap, wherein the overlap comprises two inverted V-shaped grooves in the top layer of the overlap and one inverted V-shaped ridge in the bottom layer of the overlap.

FIG. 5C is a schematic representation of a jacket fitting having an overlap, wherein the overlap comprises two inverted V-shape grooves 52 and 56 in the top layer 50 of the overlap and one inverted V-shape ridge 60 in the bottom layer 58 of the overlap. Incremental tightening of the jacket is accomplished by sliding and moving either the top layer 50 of the bottom layer 58 so that ridge 60 is positioned into groove 56. The distance denoted by the numeral 54 between grooves 52 and 56 can be of from about 0.25 to about 1.0 inch or more, depending on the quality of firmness and the diameter of the underlying insulation. This embodiment, similarly to the embodiment described with respect to FIG. 5A allows only for one incremental adjustment of the overlapping jacket.

Figure 5D:
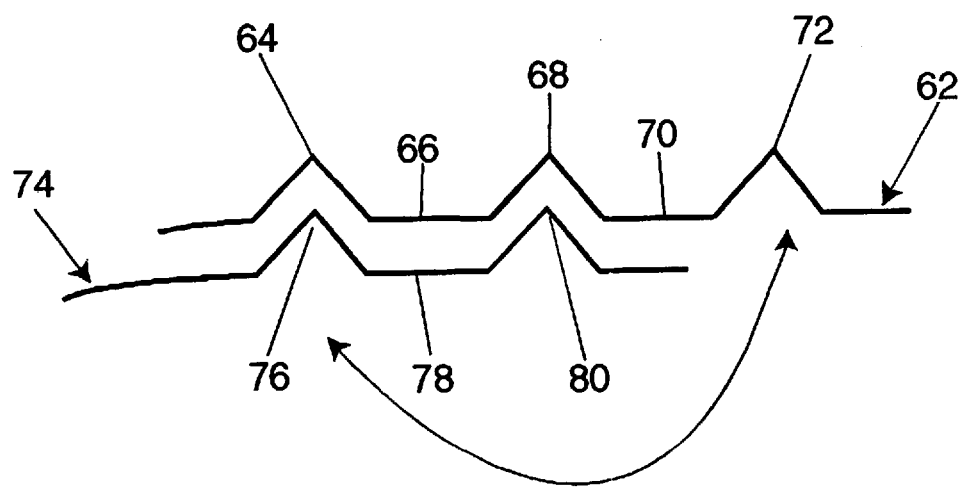
FIG. 5D is a schematic representation of a jacket fitting having an overlap, wherein the overlap comprises three inverted V-shaped grooves in the top layer of the overlap and two inverted V-shaped ridges in the bottom layer of the overlap.

FIG. 5D is a schematic representation of a jacket fitting having an overlap, wherein the overlap comprises three inverted V-shape grooves 64, 68 and 72 in the top layer 62 of the overlap and two inverted V-shape ridges 76 and 80 in the bottom layer 62 of the overlap. Incremental tightening of the jacket is accomplished by sliding and moving either the top layer 62 or the bottom layer 74 so that ridge 76 is positioned into groove 41. It is to be noted that this embodiment of the invention, similarly to that described in FIG. 5B, includes a plurality of grooves and matching ridges so that the incremental adjustment of the overlap can be repeated several times as desired.

Similarly to that described in FIGS. 5A–5C, the distance between grooves denoted by the numeral 66 between grooves 64 and 68, and the distance denoted by the numeral 70 between grooved 68 and 72 can be of from about 0.25 to about 1.0 inch or more, depending on the quality of firmness and the diameter of the underlying insulation.

Figure 6:
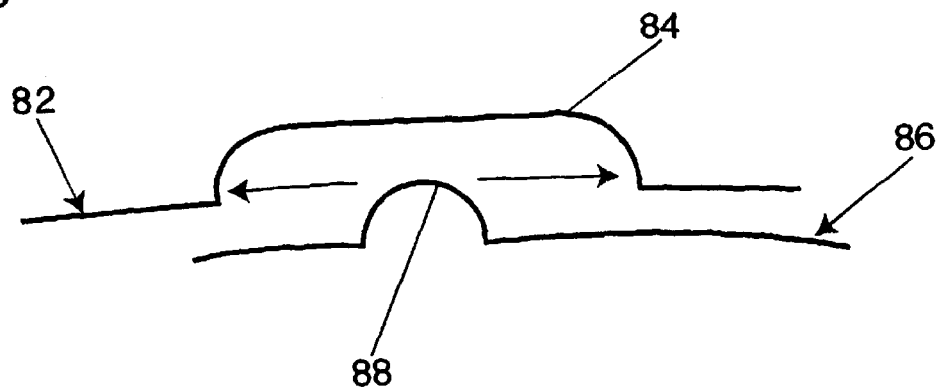
FIG. 6 is a schematic representation of a jacket fitting having an overlap, wherein the overlap comprises a generally flat, extended groove in the top layer of the overlap and a round ridge in the bottom layer of the overlap.

FIG. 6 is a schematic representation of another embodiment of the present invention of a jacket fitting having an overlap, wherein the overlap comprises a generally flat, extended groove 84 in the top layer 82 of the overlap and a generally round ridge 88 in the bottom layer 86 of the overlap. This overlap allows for exact tensioning of the overlap over the insulation. The exact tensioning is accomplished by sliding the top layer 82 or the bottom layer 86 of the overlap so that ridge 88 moves within groove 84. While this design allows for exact tensioning of the jacket, it does not provide for a wide range of tolerance. The range of tolerance of ridge 88 within groove 84 is typically of from about 1.5 to about 3.5 inches. This jacket design can, of course, be used on both sides, i.e., both halves of the jacket to allow double sliding movement of ridge 88 within groove 84.

It is, however, preferred to use a combination of jacket design described in FIGS. 5A–5D with the jacket design described in FIG. 6. The combination allows tightening of the jacket in large increments using the design of FIGS. 5A–5D, and then finally tensioning the jacket using the design described in FIG. 6. The design of FIGS. 5A–5D is positioned on one side of the jacket and the design of FIG. 6 is positioned on the other side of the jacket.

Figure 7:
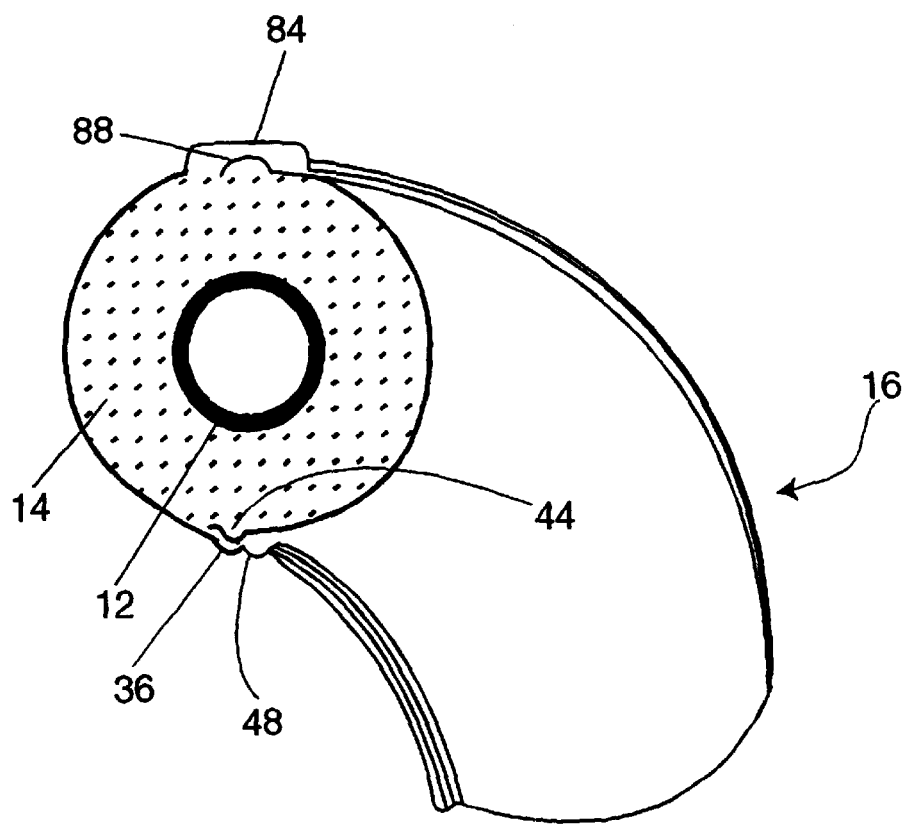
FIG. 7 shows in side-elevational view the combination of the jacket overlap design of FIG. 5A and FIG. 6.

The combination of the two types of design is shown in FIG. 7. Forming the overlap with the combination of the designs, the jacket provides both a superior weather barrier and allows the jacket to be tightened snugly over the insulation. The combination design can be used for all types of insulation, including rigid insulation which has no "give" and requires the jacket to accommodate both large and small circumferences. By having the jacket fit snugly over the insulation, the rigid insulation is contained and supported by the jacket and better survives foot traffic without bending or denting the jacket. For maintenance purposes of industrial conduit when walking on the insulated and jacketed conduit, the jacket should be of metal, such as stainless steel or aluminum.

The method of installing jackets, metal or plastic, over insulations includes the step of: securing the jacket with sheet metal screws, evenly spaced in the overlaps, while the jacket is tightly held in place with "bungee type cords" or other devices that will tightly adjust the flaps of the jacket.

The jacket can also be held in place with metal bands or straps which are properly tensioned to tighten the jacket around the insulation. Both methods can be used singly or is in combination.

While the designs of jacket fitting illustrated in the drawings show fitting having approximately 45° angles, the designs include jacket fitting of 90°, Tees and vertical and horizontal straight run jacketings.

Having described the invention, it will be obvious to those skilled in the art that various modifications of the invention can be made without departing from the spirit and scope of the invention.

| PARTS LIST | |
|---|---|
| Assembly of metal pipe, insulation and metal jacket (generally designated) | 10 |
| Metal pipe | 12 |
| Insulation | 14 |
| Metal jacket | 16 |
| Metal jackets comprising two halves | 16A & 16B |
| Point of overlap between two halves | P |
| Grooves and ribs in jacket (prior art) | 18 & 20 |
| Top layer of overlap | 22, 34, 50, 62 |
| Bottom layer of overlap | 30, 42, 58, 74 |
| Grooves | 24, 28, 36, 40, 41, 52, 56, 64, 68, 72 |
| Ridges | 32, 44, 48, 60, 76, 80 |
| Distance between grooves | 26, 38, 39, 54, 66, 70 |
| Distance between ridges | 46, 78 |
| Top layer of overlap | 82 |

-continued

PARTS LIST

| | |
|---|---|
| Flat, extended groove | 84 |
| Bottom layer of overlap | 86 |
| Round ridge to slide within flat, extended groove | 88 |

What is claimed is:

1. An adjustable jacket for an insulated conduit carrying a fluid therein, the adjustable jacket comprising:
    a longitudinal first section having end portions and side portions and being of a generally semi-circular cross-sectional configuration;
    a longitudinal second section having end portions and side portions and being of a generally semi-circular cross-sectional configuration;
        wherein said longitudinal first section and said longitudinal second section form a generally cylindrical configuration over an insulated conduit;
    longitudinal overlapping flanges projecting from said side portions;
    a plurality of longitudinal grooves in said flange of the first section;
    one or more longitudinal ridge(s) in said flange of the second section,
        wherein said flanges are incrementally adjustable over said insulated conduit by snap-fitting said ridges into one or more of said grooves for tight conformance of said adjustable jacket over said insulated conduit and wherein said ridges deflect intrusion of precipitation into said insulated conduit.

2. The adjustable jacket of claim 1 wherein said longitudinal grooves and said longitudinal ridges are of generally round-shaped configuration.

3. The adjustable jacket of claim 1 wherein said longitudinal grooves and said longitudinal ridges are of an inverted V-shaped configuration.

4. The adjustable jacket of claim 1 made of stainless steel, aluminum or thermoplastic materials.

5. The adjustable jacket of claim 1 wherein said insulation is rigid.

6. The adjustable jacket of claim 5 wherein said insulation is selected from the group consisting of calcium silicate, perlite silicate, cellular glass, styrofoam and polyisocyanourate/urethane.

7. The adjustable jacket of claim 1 wherein said insulation is semi-rigid.

8. The adjustable jacket of claim 7 wherein said insulation is high density mineral wool.

9. The adjustable jacket of claim 1 wherein said insulation is soft insulation.

10. The adjustable jacket of claim 9 wherein said insulation is selected from the group consisting of soft fiberglass, soft elastomers and soft elastomeric foams.

11. The adjustable jacket of claim 1 wherein said insulated conduit is of a configuration selected from the group consisting of straight, 45° angle, 90° angle and T angle.

12. A jacket, adjustable on each side thereof, for an insulated conduit carrying a fluid therein, the jacket comprising:
    a longitudinal first section having end portions and side portions and being of a generally semi-circular cross-sectional configuration;
    a longitudinal second section having end portions and side portions and being of a generally semi-circular cross-sectional configuration;
        wherein said longitudinal first section and said longitudinal second section form a generally cylindrical configuration over an insulated conduit;
    a longitudinal flange projecting from each of said side portions of said first section;
    a longitudinal flange projecting from each of said side portions of said second section;
    a plurality of longitudinal grooves in each of said longitudinal flange of said first section;
    one or more longitudinal ridge(s) in each of said longitudinal flange of said second section;
        wherein said longitudinal grooves in each of said longitudinal flange of said first section inter-engage the longitudinal ridge(s) in each of said longitudinal flange of the second section by incrementally tightening the flanges of the first section and flanges of the second section and snap-fitting said grooves and ridges together, and wherein said ridges deflect intrusion of precipitation into said insulated conduit.

13. The jacket of claim 12 wherein said longitudinal grooves and said longitudinal ridges are of generally round-shaped configuration.

14. The jacket of claim 12 wherein said longitudinal grooves and said longitudinal ridges are of an inverted V-shaped configuration.

15. The jacket of claim 12 made of stainless steel, aluminum or thermoplastic materials.

16. The jacket of claim 12 wherein said insulation is rigid.

17. The jacket of claim 16 wherein said insulation is selected from the group consisting of calcium silicate, perlite silicate, cellular glass, styrofoam and polyisocyanourate/urethane.

18. The jacket of claim 12 wherein said insulation is semi-rigid.

19. The jacket of claim 18 wherein said insulation is high density mineral wool.

20. The jacket of claim 12 wherein said insulation is soft insulation.

21. The jacket of claim 20 wherein said insulation is selected from the group consisting of soft fiberglass, soft elastomers and soft elastomeric foams.

22. The jacket of claim 12 wherein said insulated conduit is of a configuration selected from the group consisting of straight, 45° angle, 90° angle and T angle.

23. A jacket adjustable on each side thereof for an insulated conduit carrying a fluid therein, the jacket comprising:
    a longitudinal first section having end portions and side portions and being of a generally semi-circular cross-sectional configuration;
    a longitudinal second section having end portions and side portions and being of a generally semi-circular cross-sectional configuration,
        wherein said longitudinal first section and said longitudinal second section form a generally cylindrical configuration over an insulated conduit;
    a longitudinal flange projecting from each of said side portions of said first section;
    a longitudinal flange projecting from each of said side portions of said second section;
    a longitudinal groove of extended width in one of said longitudinal flanges of said first section;
    a plurality of longitudinal grooves in the other of said longitudinal flanges of said first section;
    a longitudinal ridge in one of said longitudinal flanges of said second section for slideably engaging said groove of extended width in the longitudinal flange of said first section, thereby allowing tightening said first and second sections of said jacket;

a longitudinal ridge in the other of said longitudinal flanges of the second section for inter-engaging said plurality of grooves in said first section by incrementally tightening the flange of the first section and the flange of the second section and snap-fitting together said grooves and said ridges.

24. The jacket of claim 23 made of stainless steel, aluminum or thermoplastic materials.

25. The jacket of claim 23 wherein said insulation is rigid.

26. The jacket of claim 25 wherein said insulation is selected from the group consisting of calcium silicate, perlite silicate, cellular glass, styrofoam and polyisocyanourate/urethane.

27. The jacket of claim 23 wherein said insulation is semi-rigid.

28. The jacket of claim 27 wherein said insulation is high density mineral wool.

29. The jacket of claim 23 wherein said insulation is soft insulation.

30. The jacket of claim 29 wherein said insulation is selected from the group consisting of soft fiberglass, soft elastomers and soft elastomeric foams.

31. The jacket of claim 23 wherein said insulated conduit is of a configuration selected from the group consisting of straight, 45° angle, 90° angle and T angle.

32. A method of applying an adjustable jacket around insulated straight or bend conduits comprising the steps of:
1) providing an adjustable jacket comprising:
    a longitudinal first section having end portions and side portions and being of a generally semi-circular, cross-sectional configuration;
    a longitudinal second section having end portions and side portions and being of a generally semi-circular, cross-sectional configuration, wherein said longitudinal first section and said longitudinal second section form a generally cylindrical configuration over an insulated conduit;
    longitudinal overlapping flanges projecting from said side portions;
    a plurality of longitudinal grooves in said flange of the first section;
    one or more longitudinal ridge(s) in said flange of the second section;
2) incrementally adjusting said flanges over said insulated conduit by snap-fitting said ridges into one or more of said grooves for tight conformance of said adjustable jacket over said insulated conduit; and
3) securing the tightened jacket with metal bands, straps or sheet metal screws.

33. The method of claim 32 wherein said longitudinal grooves and said longitudinal ridges are of generally round-shaped configuration.

34. The method of claim 32 wherein said longitudinal grooves and said longitudinal ridges are of an inverted V-shaped configuration.

35. The method of claim 32 wherein said jacket is made of stainless steel, aluminum or thermoplastic materials.

36. The method of claim 32 wherein said insulation is rigid.

37. The method of claim 36 wherein said insulation is selected from the group consisting of calcium silicate, perlite silicate, cellular glass, styrofoam and polyisocyanourate/urethane.

38. The method of claim 32 wherein said insulation is semi-rigid.

39. The method of claim 32 wherein said insulation is high density mineral wool.

40. The method of claim 32 wherein said insulation is soft insulation.

41. A method of applying an adjustable jacket around insulated straight or bend conduits comprising the steps of;
1) providing an adjustable jacket comprising:
    a longitudinal first section having end portions and side portions and being of a generally semi-circular, cross-sectional configuration;
    a longitudinal second section having end portions and side portions and being of a generally semi-circular, cross-sectional configuration, wherein said longitudinal first section and said longitudinal second section form a generally cylindrical configuration over an insulated conduit;
    a longitudinal flange projecting from each of said side portions of said first section;
    a longitudinal flange projecting from each of said side portions of said second section;
    a plurality of longitudinal grooves in each of said longitudinal flange of said first section;
    one or more longitudinal ridge(s) in each of said longitudinal flanges of said second section;
2) inter-engaging said longitudinal grooves in each of said longitudinal flange of said first section with the longitudinal ridges in each of said longitudinal flange of said second section;
3) incrementally tightening the flanges of the first section and the flanges of the second section and snap-fitting together said grooves and ridges; and
4) securing the tightened jacket with metal bands, straps or sheet metal screws.

42. The method of claim 41 wherein said longitudinal grooves and said longitudinal ridges are of generally round-shaped configuration.

43. The method of claim 41 wherein said longitudinal grooves and said longitudinal ridges are of an inverted V-shaped configuration.

44. The method of claim 41 wherein said jacket is made of stainless steel, aluminum or thermoplastic materials.

45. The method of claim 41 wherein said insulation is rigid.

46. The method of claim 45 wherein said insulation is selected from the group consisting of calcium silicate, perlite silicate, cellular glass, styrofoam and polyisocyanourate/urethane.

47. The method of claim 41 wherein said insulation is semi-rigid.

48. The method of claim 47 wherein said insulation is high density mineral wool.

49. The method of claim 41 wherein said insulation is soft insulation.

50. The method of claim 49 wherein said insulation is selected from the group consisting of soft fiberglass, soft elastomers and soft elastomeric foams.

51. A method of applying an adjustable jacket around insulated straight or bend conduits comprising the steps of:
1) providing an adjustable jacket comprising:
    a longitudinal first section having end portions and side portions and being of a generally semi-circular, cross-sectional configuration;
    a longitudinal second section having end portions and side portions and being of a generally semi-circular, cross-sectional configuration, wherein said longitudinal first section and said longitudinal second section form a generally cylindrical configuration over an insulated conduit;

a longitudinal flange projecting from each of said side portions of said first section;

a longitudinal flange projecting from each of said side portions of said second section;

a longitudinal groove of extended width in one of said longitudinal flanges of said first section;

a plurality of longitudinal grooves in the other of said longitudinal flanges of said first section;

a longitudinal ridge in one of said longitudinal flanges of said second section for slideably engaging said groove of extended width in the longitudinal flange of said first section, thereby allowing tightening said first and second sections of said jacket;

a longitudinal ridge in the other of said longitudinal flanges of the second section for inter-engaging said plurality of grooves in said first section by incrementally tightening the flange of the first section and the flange of the second section and snap-fitting together said grooves and said ridge;

2) inter-engaging said longitudinal ridge in one of said longitudinal flanges of the second section with one of said plurality of grooves in said first section by incrementally tightening the flange of the first section and the flange of the second section and snap-fitting together said groves and said ridges;

3) slideably engaging the groove of extended width in the longitudinal flange of said first section with said longitudinal ridge in the other of said longitudinal flanges of said second section and tightening said adjustable jacket; and 4) securing the tightened jacket with metal bands, straps or sheet metal screws.

52. The method of claim 51 wherein said jacket is made of stainless steel, aluminum or thermoplastic materials.

53. The method of claim 51 wherein said insulation is rigid.

54. The method of claim 51 wherein said insulation is selected from the group consisting of calcium silicate, perlite silicate, cellular glass, styrofoam and polyisocyanourate/urethane.

55. The method of claim 51 wherein said insulation is semi-rigid.

56. The method of claim 55 wherein said insulation is high density mineral wool.

57. The method of claim 51 wherein said insulation is soft insulation.

58. The method of claim 57 wherein said insulation is selected from the group consisting of soft fiberglass, soft elastomers and soft elastomeric foams.

* * * * *